US007069567B2

(12) United States Patent
Tsuchiya (10) Patent No.: US 7,069,567 B2
(45) Date of Patent: Jun. 27, 2006

(54) DISC DEVICE WITH TRANSPORT ROLLER BRACKET RESTRAINING DETECTION PROTRUSIONS AWAY FROM OUTER PERIPHERAL EDGE OF DISC

(75) Inventor: Tatsuhiko Tsuchiya, Iwaki (JP)

(73) Assignee: Alpine Electronics, Inc., Tokyo (JP)

( * ) Notice: Subject to any disclaimer, the term of this patent is extended or adjusted under 35 U.S.C. 154(b) by 416 days.

(21) Appl. No.: 10/724,928

(22) Filed: Dec. 1, 2003

(65) Prior Publication Data
US 2004/0148618 A1 Jul. 29, 2004

(30) Foreign Application Priority Data
Dec. 2, 2002 (JP) ............................. 2002-349469

(51) Int. Cl.
*G11B 17/05* (2006.01)
(52) U.S. Cl. ..................................... 720/623
(58) Field of Classification Search ................ 720/624, 720/623, 621; 369/75.21
See application file for complete search history.

(56) References Cited

U.S. PATENT DOCUMENTS 5,031,169 A  7/1991  Kato et al. .................. 720/625

2002/0001280 A1 *  1/2002  Yabushita .................. 369/77.1

OTHER PUBLICATIONS

English language translation of abstract of Japanese Patent JP 11-007689.

* cited by examiner

*Primary Examiner*—Julie Anne Watko
(74) *Attorney, Agent, or Firm*—Brinks Hofer Gilson & Lione (57) ABSTRACT

A disc device including a disc driving section, a transport roller, a positioning member, a detection section, a transmitting member for transmitting movement of the detection section to the positioning member, a roller supporting member for moving the transport roller to a transport position where the transport roller is capable of transporting a disc and to a retreat position where the transport roller is separated from the disc, and a restraining section disposed at the roller supporting member. When the transport roller moves to the retreat position, the detection section is restrained by being moved in a predetermined direction by the restraining section and the movement of the detection section when restraining the detection section is transmitted to the positioning member through the transmitting member, so that the positioning member moves so as to separate from the outer peripheral edge of the disc.

27 Claims, 9 Drawing Sheets

DISC DEVICE WITH TRANSPORT ROLLER BRACKET RESTRAINING DETECTION PROTRUSIONS AWAY FROM OUTER PERIPHERAL EDGE OF DISC

BACKGROUND OF THE INVENTION

1. Field of the Invention

The present invention relates to a disc device in which a disc, such as a compact disc (CD) or a digital versatile disc (DVD), is transported to and positioned at a disc driving section by a transport roller. More particularly, the present invention relates to a disc device which is capable of preventing a disc positioning member from interfering with the rotation of the disc that is being driven.

2. Description of the Related Art

In a disc device for recording information onto and reproducing it from a disc by automatically pulling the disc into the disc device, the disc that is inserted needs to be reliably positioned on a turntable of a disc driving section. In a disc device that can receive, for example, a disc having a small diameter of 8 cm and a disc having a large diameter of 12 cm, it is necessary to position these discs on the same turntable.

Therefore, in such related disc devices, a positioning member which comes into contact with the outer peripheral edge of the disc that is inserted in order to position the central portion of a disc on the turntable is disposed at the back side of the disc driving section. The positioning member is constructed so that, when a disc having a small diameter of 8 cm is inserted, the positioning member is positioned at a location where the outer peripheral edge of the small-diameter disc comes into contact therewith, whereas, when a disc having a large diameter of 12 cm is inserted, the positioning member is moved to a location where the outer peripheral edge of the large-diameter disc comes into contact therewith. Therefore, in general, related disc devices are constructed so that the small-diameter disc and the large-diameter disc are positioned by the same positioning member.

However, in such disc devices including a disc positioning member as mentioned above, it is necessary to use a structure for separating the positioning member from the outer peripheral edge of the small-diameter disc or the large-diameter disc after positioning the central portion of the small-diameter disc or the large-diameter disc at the disc driving section and clamping the central portion of the small-diameter disc or the large-diameter disc to the turntable. When this structure is not provided, the disc that is rotating may become damaged when its outer peripheral edge comes into contact with the positioning member.

In an example of such a structure for separating the positioning member from the outer peripheral edge of the disc after positioning the central portion of the disc at the disc driving section, the positioning member is disposed at a clamp arm including a clamper. In the structure, when the clamp arm rotates in a clamp direction, the path of rotation is made use of to separate the positioning member from the outer peripheral edge of the disc. However, in this structure, it is difficult to sufficiently separate the positioning member from the outer peripheral edge of the disc. In particular, in a thin disc device, since the angle of rotation of the clamp arm is small when clamping the disc, the positioning member cannot be sufficiently separated from the outer peripheral edge of the disc.

SUMMARY OF THE INVENTION

Accordingly, it is an object of the present invention to provide a disc device that makes it possible to reliably separate the outer peripheral edge of a rotationally driven disc from a positioning member without having to use a complicated structure.

To this end, according to the preferred embodiments, a disc device is provided comprising a disc driving section including a turntable, a transport roller for transporting a disc towards the disc driving section, and a positioning member disposed closer to a back side of the disc device than the disc driving section in a disc insertion direction. An outer peripheral edge of the disc that is transported by the transport roller comes into contact with the positioning member and is positioned so that a central portion of the disc is set at the disc driving section. The disc device further comprises a detection section disposed closer to a front side of the disc device than the disc driving section in the disc insertion direction, and being pushed and moved by the outer peripheral edge of the disc that is transported towards the disc driving section; a transmitting member for transmitting movement of the detection section to the positioning member; a roller supporting member for moving the transport roller to a transport position where the transport roller is capable of transporting the disc and to a retreat position where the transport roller is separated from the disc; and a restraining section disposed at the roller supporting member. When the transport roller moves to the retreat position, the detection section is restrained by being moved in a predetermined direction by the restraining section, and the movement of the detection section when restraining the detection section is transmitted to the positioning member through the transmitting member, so that the positioning member moves so as to separate from the outer peripheral edge of the disc.

In the disc device, the detection section is moved by a moving force of the roller supporting member through the restraining section, so that the positioning member retreats by a moving force of the detection section through the transmitting member. The detection section can be used for detecting insertion and ejection of the disc, or as means for determining whether the disc that is inserted is a large-diameter disc or a small-diameter disc. Therefore, it is possible to reliably separate the positioning member from the disc on the disc driving section at a good timing without having to use an elaborate additional mechanism.

In a first form, the roller supporting member moves the transport roller to the transport position and to the retreat position by rotating around a shaft, serving as a fulcrum, that is substantially parallel to a disc surface, and the restraining section is disposed at a portion of the roller supporting member that approaches the disc when the transporter roller moves towards the retreat position.

In this structure, when the transport roller separates from the disc and moves to the retreat position, the restraining section rotates towards the disc, so that the detection section can move in a predetermined direction by the rotation of the restraining section.

In a second form, the restraining section has a recess, and, when the transport roller moves from the transport position to the retreat position, the detection section is restrained by being guided into the recess.

In a third form, the detection section is urged in a direction in which the detection section contacts the outer peripheral edge of the disc that is transported, and the restraining section comprises a restricting portion and a recess, the restricting portion restricting movement of the detection section in the urging direction when the transport roller is set at the transport position, the recess guiding the detection section that is separated from the restricting portion when the transport roller moves towards the retreat position.

In other words, the structure may be such that the restraining section has, for example, a recess, and that the detection section is forcedly drawn into the recess by, for example, a rotational force of the roller supporting member or that the detection section is moved into the recess by making use of an urging force which urges the detection section so that it contacts the outer peripheral edge of the disc.

In a fourth form, the recess extends in an inclined manner with respect to a central line of movement of the disc that is transported by the transport roller, and, when the transport roller moves from the transport position to the retreat position, the detection section smoothly moves in the predetermined direction by being guided to the recess.

In a fifth form, the transmitting member rotates around a rotary shaft, serving as a fulcrum, that is substantially perpendicular to a disc surface, and the detection section is disposed at one end of the transmitting member and the positioning member is connected to the other end of the transmitting member.

In a sixth form, the transport roller is capable of transporting a large-diameter disc and a small-diameter disc, and, by a difference between an amount of movement of the transmitting member when the detection section is pushed by an outer peripheral edge of the large-diameter disc and an amount of movement of the transmitting member when the detection section is pushed by an outer peripheral edge of the small-diameter disc, the positioning member is selectively set at one of a position where the positioning member positions a central portion of the small-diameter disc at the disc driving section and a position where the positioning member positions a central portion of the large-diameter disc at the disc driving section.

In this way, the detection section for setting the position of the positioning member according to the diameter of the disc can be used as a mechanism for separating the positioning member from the disc on the disc driving section.

In a seventh form, the disc device further comprises a chassis having the disc driving section disposed thereat and including a first guide path and a second guide path that are continuously formed, the second guide path being located closer to the back side of the disc device than the first guide path in the disc insertion direction. The positioning member is movable in the first guide path and the second guide path. By the difference between the amounts of movement of the transmitting member, the positioning member selectively enters one of the first guide path and the second guide path. When the positioning member enters the first guide path, the central portion of the small-diameter disc is capable of being positioned at the disc driving section. When the positioning member enters the second guide path, the central portion of the large-diameter disc is capable of being positioned at the disc driving section.

DESCRIPTION OF THE PREFERRED EMBODIMENT

Figure 1:
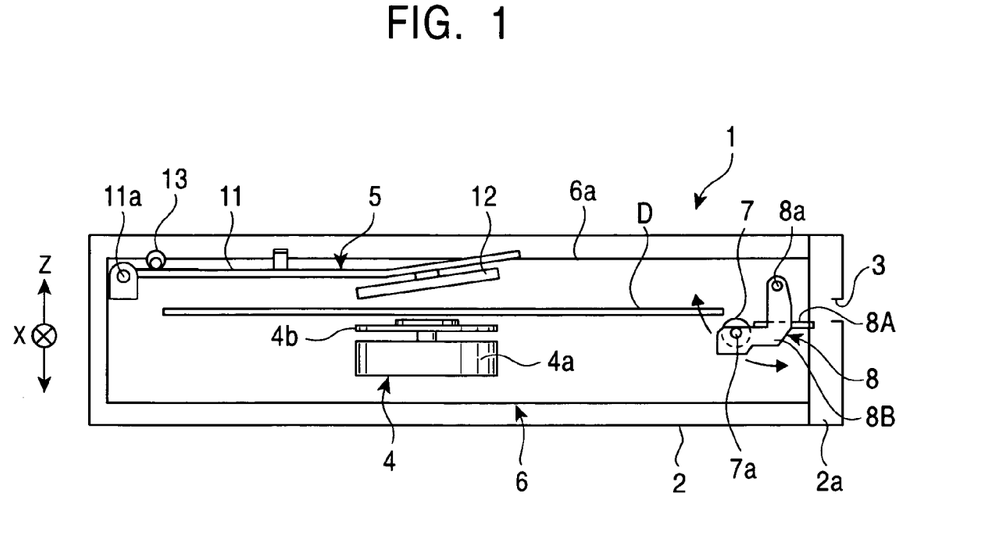
FIG. 1 is a side view schematically showing the structure of a preferred embodiment of the present invention.

A disc device 1 shown in FIG. 1 can reproduce information from and/or record the information onto a disc, such as a compact disc (CD) or a digital versatile disc (DVD), having a diameter of 8 cm or a diameter of 12 cm. A disc having a diameter of 8 cm is referred to as a small-diameter disc Ds, and a disc having a diameter of 12 cm is referred to as a large-diameter disc D.

A nose 2a, which has a liquid crystal display panel and various switches disposed thereat, is disposed at the front surface of a housing 2, which forms the external shape of the disc device 1 shown in FIG. 1. A slit-shaped insertion opening 3, which extends in the widthwise direction (direction X), is formed in the nose 2a.

A chassis 6 is disposed in the housing 2. A rotationally driving section (disc driving section) 4 and a clamp 5 are mounted to the chassis 6. The rotationally driving section 4 is disposed below a path for inserting the disc D, while the clamp 5 is disposed above the path for inserting the disc D. The rotationally driving section 4 comprises a spindle motor 4a and a turntable 4b. The turntable 4b is mounted to a rotary shaft of the spindle motor 4a and is used for placing the disc D. The clamp 5 comprises a clamp arm 11 and a clamper 12 rotatably mounted to an end of the clamp arm 11. A base end 11a of the clamp arm 11 is rotatably supported by the chassis 6 disposed in the housing 2. The clamper 12 opposes the top portion of the turntable 4b. By a torsion spring 13 shown in FIG. 1, the clamp arm 11 is urged at all times in a direction in which it approaches the disc D.

Clamper setting means (not shown) is disposed in the disc device 1 for setting the clamp 5 in an unclamping posture and a clamping posture. In the unclamping posture, the clamp arm 11 is lifted in a direction in which the clamp arm 11 separates from the turntable 4b. In the clamping posture, the clamp arm 11 is moved down so that the disc D can be clamped between the clamper 12 and the turntable 4b.

A transport roller 7, which comprises a disc transporting means, is disposed inwardly of the insertion opening 3 of the chassis 6. The transport roller 7 is long in the widthwise direction (X direction). A roller bracket (roller supporting member) 8 is disposed between both side surfaces of the chassis 6. The roller bracket 8 comprises a body 8A and L-shaped arms 8B and 8B. The body 8A extends in the widthwise direction (X direction). The arms 8B and 8B are formed at both sides of the body 8A by bending. The upper ends of the arms 8B and 8B are rotatably supported by side plates of the chassis 6 by respective shafts 8a and 8a. Shafts 7a and 7a protrude from respective end surfaces of the transport roller 7. The shafts 7a and 7a are rotatably supported at end portions (facing the back side (Y1 direction) of the disc device 1) of the respective arms 8B and 8B of the roller bracket 8.

Figure 2:
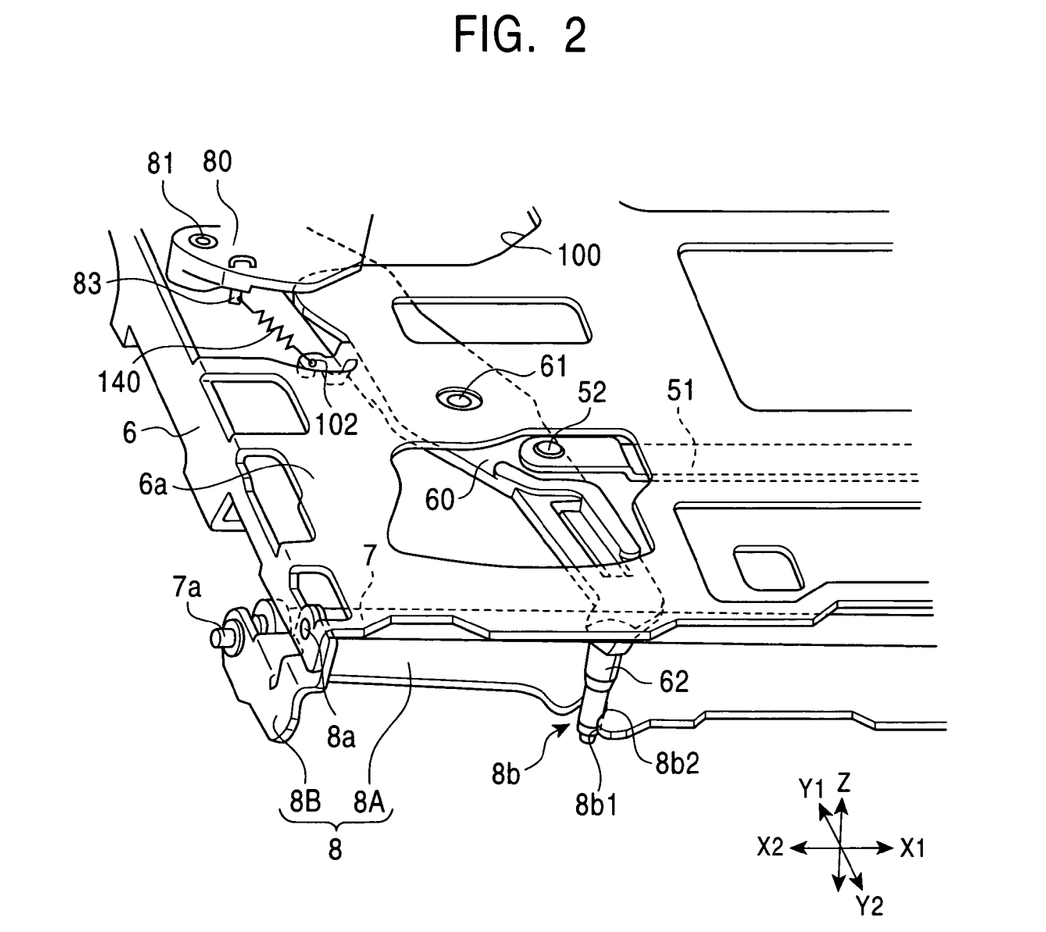
FIG. 2 is perspective view partly showing a chassis, etc., in the disc device.
Figure 3:
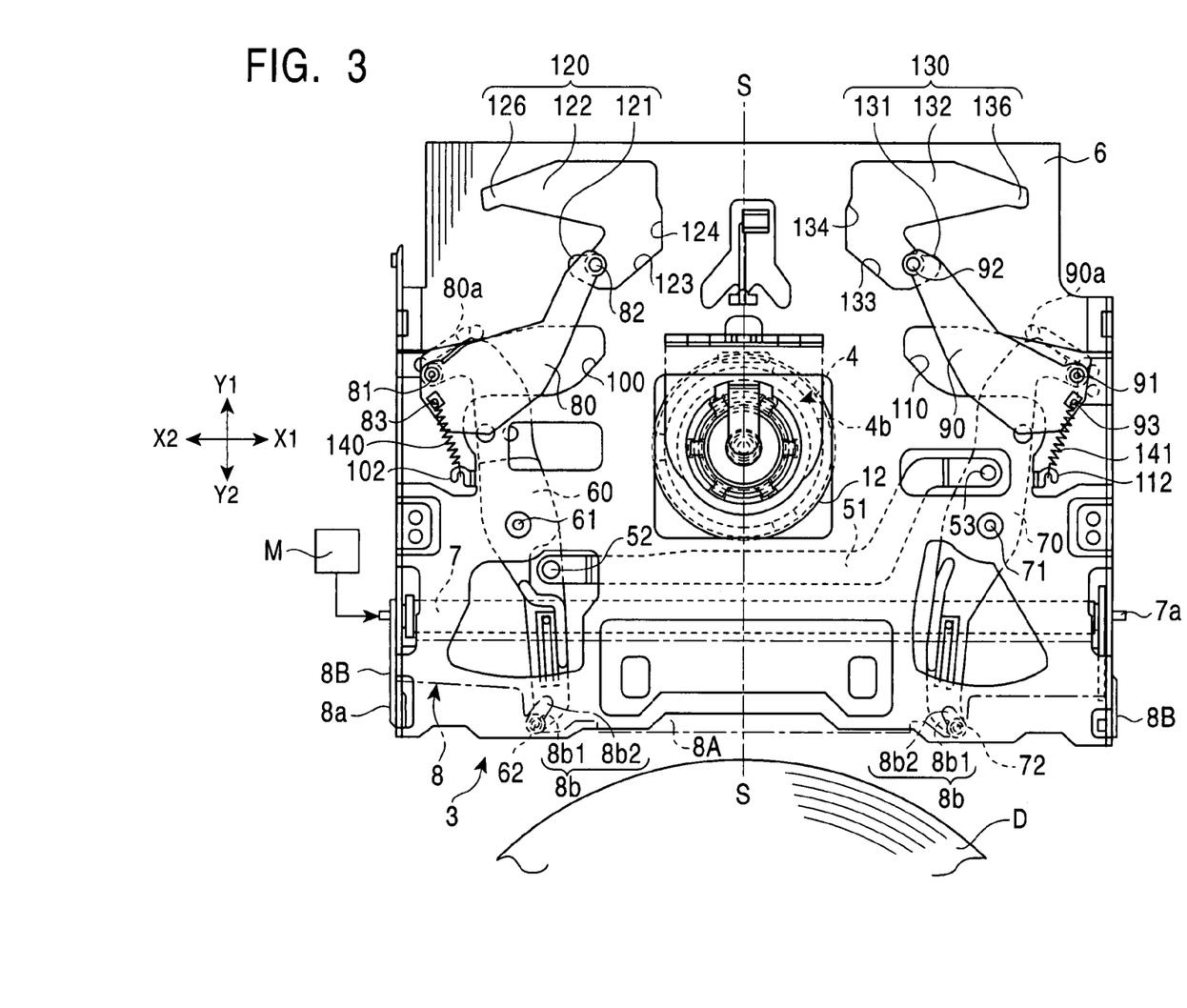
FIG. 3 is a plan view of the disc device in a disc insertion waiting state.
Figure 4:
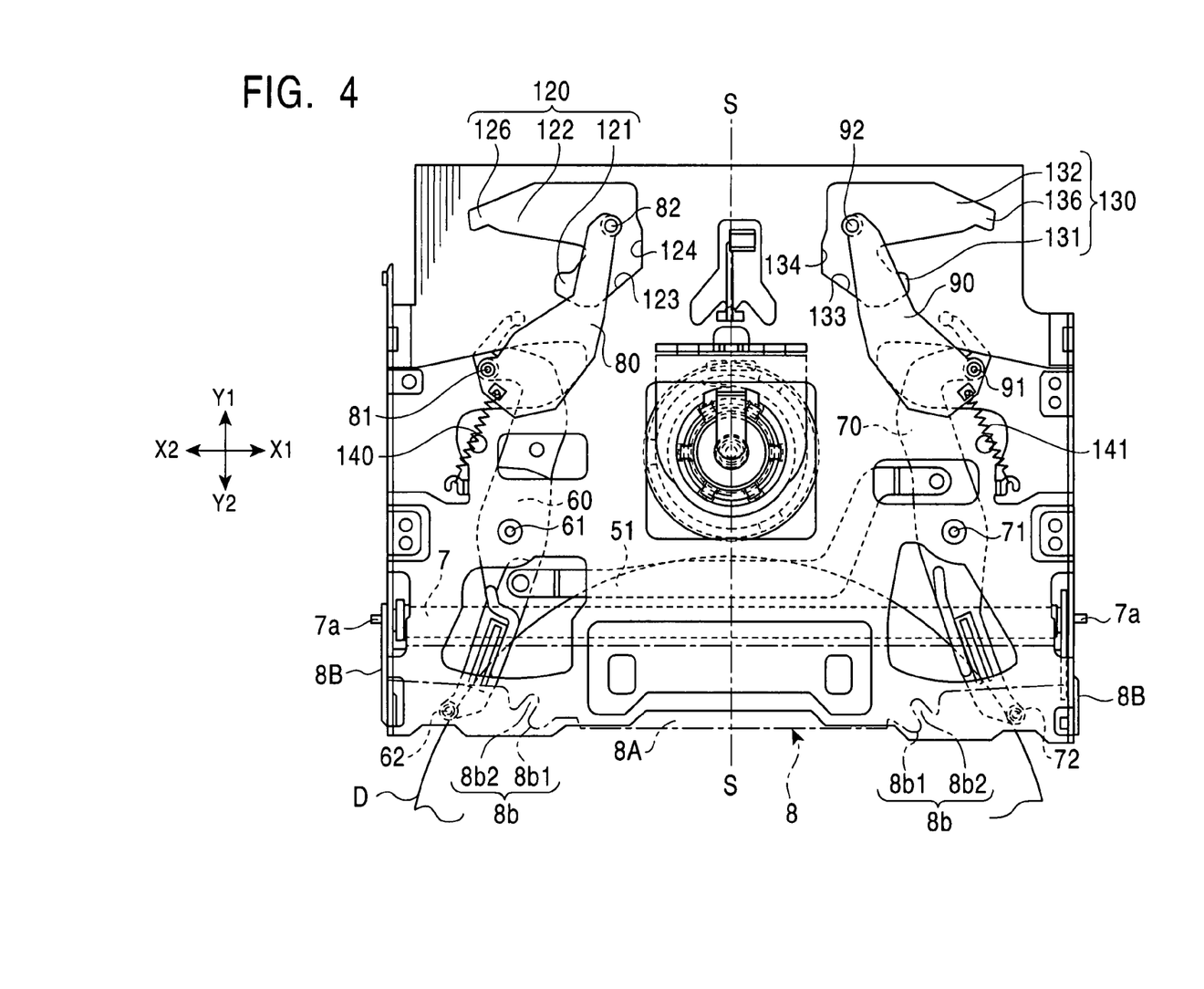
FIG. 4 is a plan view of the disc device in a disc loading state in which a disc is transported.

As shown in FIGS. 2 to 4, a pair of restraining sections 8b and 8b are formed at respective edges (facing the insertion opening 3) of the body 8A of the roller bracket 8. The restraining sections 8b and 8b are formed on the left and right sides of and at equal distances from a movement central line S—S along which the central portion of the disc that is transported by the transport roller 7 passes. Each restraining section 8b comprises a restricting portion 8b1 and a substantially U-shaped recess 8b2. The restricting portion 8b1 protrude away from each other with respect to the movement central line S—S. Each recess 8b2 is formed continuously with the outer edge of the restricting portion 8b1 corresponding thereto. Each recess 8b2 is inclined so as to gradually extend closer to the movement central line S—S as it extends towards the back side (Y1 direction) of the disc device 1.

A transport motor M (see FIG. 3) is mounted to the chassis 6. Power from the transport motor M is applied to the shafts 7a through a speed reducing gear train (not shown), causing the transport roller 7 to be rotationally driven in both the forward and reverse directions.

Roller setting means (not shown) for setting the posture of the transport roller 7 is disposed in the disc device 1. When the roller bracket 8 is rotated by the roller setting means in the clockwise direction in FIG. 1 around the shafts 8a and 8a as centers, the transport roller 7 comes into contact with the lower surface of the disc D, and is set at a transport position where it can apply transport force to the disc D. In contrast, when the roller bracket 8 is rotated in the counterclockwise direction, the transport roller 7 separates from the lower surface of the disc D, and is set at a retreat position where it cannot apply transport force to the disc D. The roller setting means is driven by, for example, power from the transport motor M that drives the transport roller 7, or power from a motor that rotates the clamp arm 11 of the clamp 5.

The chassis 6 is resiliently supported by resilient supporting members, such as an oil clamper or an air clamper and a coil spring, in the housing 2. Therefore, when the disc device 1 is installed in a vehicle, vibration from the vehicle body is not directly transmitted to the chassis 6 from the housing 2.

A lock mechanism (not shown) is disposed in the disc device 1. When the transport roller 7 reaches the transport position where it can transport the disc D as a result of the roller bracket 8 being rotated clockwise by the roller setting means, the lock mechanism locks the chassis 6 with respect to the housing 2. Thus, the disc D inserted from the insertion opening 3 is stably guided to the rotationally driving section 4. In contrast, when the transport roller 7 reaches a waiting position where it is separated from the disc D as a result of the roller bracket 8 being rotated counterclockwise by the roller setting means, the lock mechanism is unlocked, causing the chassis 6 to be resiliently supported by the resilient supporting members in the housing 2.

As shown in FIGS. 2 to 6, a pair of transmitting arms (transmitting members) 60 and 70 and a pair of positioning members 80 and 90, which are moved by the respective transmitting arms 60 and 70, are disposed at respective sides in the X direction in the chassis 6 of the disc device 1.

The transmitting arm 60 and the positioning member 80 are connected together substantially symmetrically on the left and right sides. Similarly, the transmitting arm 70 and the positioning member 90 are connected together substantially symmetrically on the left and right sides.

The transmitting arms 60 and 70 extend towards the front and back (Y1 direction and Y2 direction) along the path of transportation of the disc D, and are rotatably supported at the lower surface of a ceiling plate 6a of the chassis 6 by respective shafts 61 and 71. Detection protrusions (detection sections) 62 and 72 are secured to ends (disposed at a Y2 side and facing the insertion opening 3) of the respective transmitting arms 60 and 70. The detection protrusions 62 and 72 extend downward in a Z direction from the ceiling plate 6a. In the disc insertion waiting state shown in FIG. 3, the detection protrusions 62 and 72 oppose the respective restraining sections 8b and 8b formed at the body 8A of the roller bracket 8.

The detection protrusions 62 and 72 are integrally formed with the respective transmitting arms 60 and 70.

The transmitting arms 60 and 70 are connected together by a connecting member 51. The connecting member 51 having an elongated shape is disposed at the lower side of the ceiling plate 6a so as to cross the movement central line S—S. A connecting pin 52, disposed at the left end (X2 side end) of the connecting member 51, is rotatably connected to the transmitting arm 60. The connection location is situated closer to the insertion opening 3 (towards the Y2 side) than the shaft 61 serving as a rotational fulcrum of the transmitting arm 60. A connecting pin 53, disposed at the right end (X1 side end) of the connecting member 51, is rotatably connected to the transmitting arm 70. The connection location is situated closer to the back side (towards a Y1 side) than the shaft 71 serving as a rotational fulcrum of the transmitting arm 70.

The transmitting arms 60 and 70 are rotated in opposite directions in synchronism with each other. Therefore, the detection protrusions 62 and 72 move towards and away from each other in synchronism with each other.

The positioning member 80 is rotatably connected to an end (towards the back side (at the Y1 side) of the disc device 1) of the transmitting arm 60 by a connecting pin 81. The positioning member 90 is rotatably connected to an end (towards the back side of the disc device 1) of the transmitting arm 70 by a connecting pin 91. While the transmitting arms 60 and 70 are disposed at the lower surface of the ceiling plate 6a of the chassis 6, the positioning members 80 and 90 are disposed at the upper surface of the ceiling plate 6a. Connection holes 100 and 110 are formed in the ceiling plate 6a. The connecting pins 81 and 91 are movably positioned in the respective holes 100 and 110.

Downwardly bent engagers 83 and 93 are formed at the respective positioning members 80 and 90. Hooks 102 and 112 are formed at the ceiling plate 6a. A coil spring (urging means) 140 is disposed between the hook 102 and the engager 83 at the positioning member 80. By a pulling urging force of the coil spring 140, the transmitting arm 60 is urged counterclockwise. A coil spring 141 is disposed between the hook 112 and the engager 93 at the positioning member 90. By a pulling urging force of the coil spring 141, the transmitting arm 70 is urged clockwise.

The engager 83, which is a connection point of the positioning member 80 and the coil spring 140, is disposed close to the connecting pin 81. By the coil spring 140, an urging force that causes the connecting pin 81 to try to position itself on a central axis of winding of the coil spring 140 is applied to the positioning member 80. Similarly, the engager 93, which is a connection point of the positioning member 90 and the coil spring 141, is disposed close to the connecting pin 91. By the coil spring 141, an urging force that causes the connecting pin 91 to try to position itself on a central axis of winding of the coil spring 141 is applied to the positioning member 90.

A pair of positioning selection holes 120 and 130 are formed in the ceiling plate 6a so that they are closer to the back side of the disc device 1 than the rotationally driving section (disc driving section) 4 and so that they are symmetrically formed on the left and right sides of the central line S—S. A positioning protrusion 82, which is downwardly secured to a Y1-side end of the positioning member 80, passes through the positioning selection hole 120, and extends downward from the ceiling plate 6a. Similarly, a positioning protrusion 92, which is downwardly secured to a Y1-side end of the positioning member 90, passes through the positioning selection hole 130, and extends downward from the ceiling plate 6a. The positioning protrusions 82 and 92 may be integrally formed with the respective positioning members 80 and 90.

The positioning selection holes 120 and 130 have two-forked shapes, and have respective first guide paths 121 and 131 and respective second guide paths 122 and 132. The first guide paths 121 and 131 receive the respective positioning protrusions 82 and 92 when positioning the small-diameter disc Ds, and are disposed towards the insertion opening (side Y2). The second guide paths 122 and 132 receive the respective positioning protrusions 82 and 92 when positioning the large-diameter disc D, and are disposed closer to the back side of the disc device 1 than the first guide paths 121 and 131. The first guide path 121 and the first guide path 131 are symmetrically disposed on the left and right sides of the movement central line S—S, and extend away from each other with respect to the movement central line S—S. The same things apply to the second guide paths 122 and 132.

The first guide path 121 and the second guide path 122 merge at the side of the movement central line S—S. Similarly, the first guide path 131 and the second guide path 132 merge at the side of the movement central line S—S. Therefore, the positioning protrusion 82 can selectively move into the first guide path 121 and the second guide path 122. Similarly, the positioning protrusion 92 can selectively move into the first guide path 131 and the second guide path 132.

The positioning member 80 has a clamping portion 80a integrally formed therewith. When the clamping portion 80a moves into the lower surface of the ceiling plate 6a, the positioning member 80 can move along the ceiling plate 6a without separating from the upper surface of the ceiling plate 6a. Similarly, the positioning member 90 has a clamping portion 90a, and moves into the lower side of the ceiling plate 6a.

Figure 9:
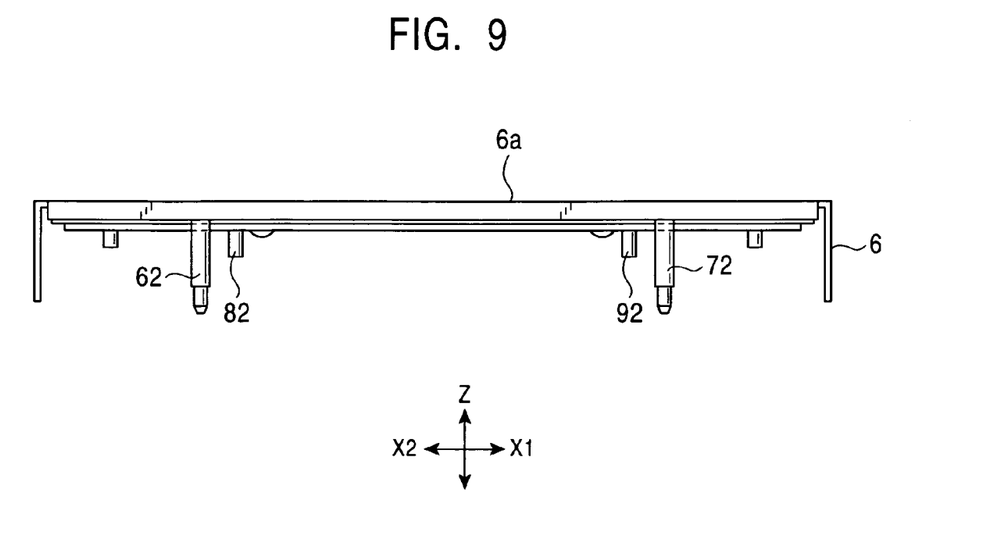
FIG. 9 is a front view of a ceiling of the chassis as seen from a disc insertion direction.

FIG. 9 is a front view of the chassis 6 as seen from the insertion opening 3. The detection protrusions 62 and 72 extend downward from the lower surface of the ceiling plate 6a so as to contact the outer peripheral edge of the disc that is inserted from the insertion opening 3. The positioning protrusions 82 and 92 also extend downward so as to contact the outer peripheral edge of the disc that is transported towards the back side of the disc device 1 by the transport roller 7.

Next, a description of the operation of the disc device 1 of the present invention will be given.

The small-diameter disc Ds having a diameter of 8 cm, and the large-diameter disc D having a diameter of 12 cm can both be loaded into the disc device 1.

(Waiting State)

Figure 7:
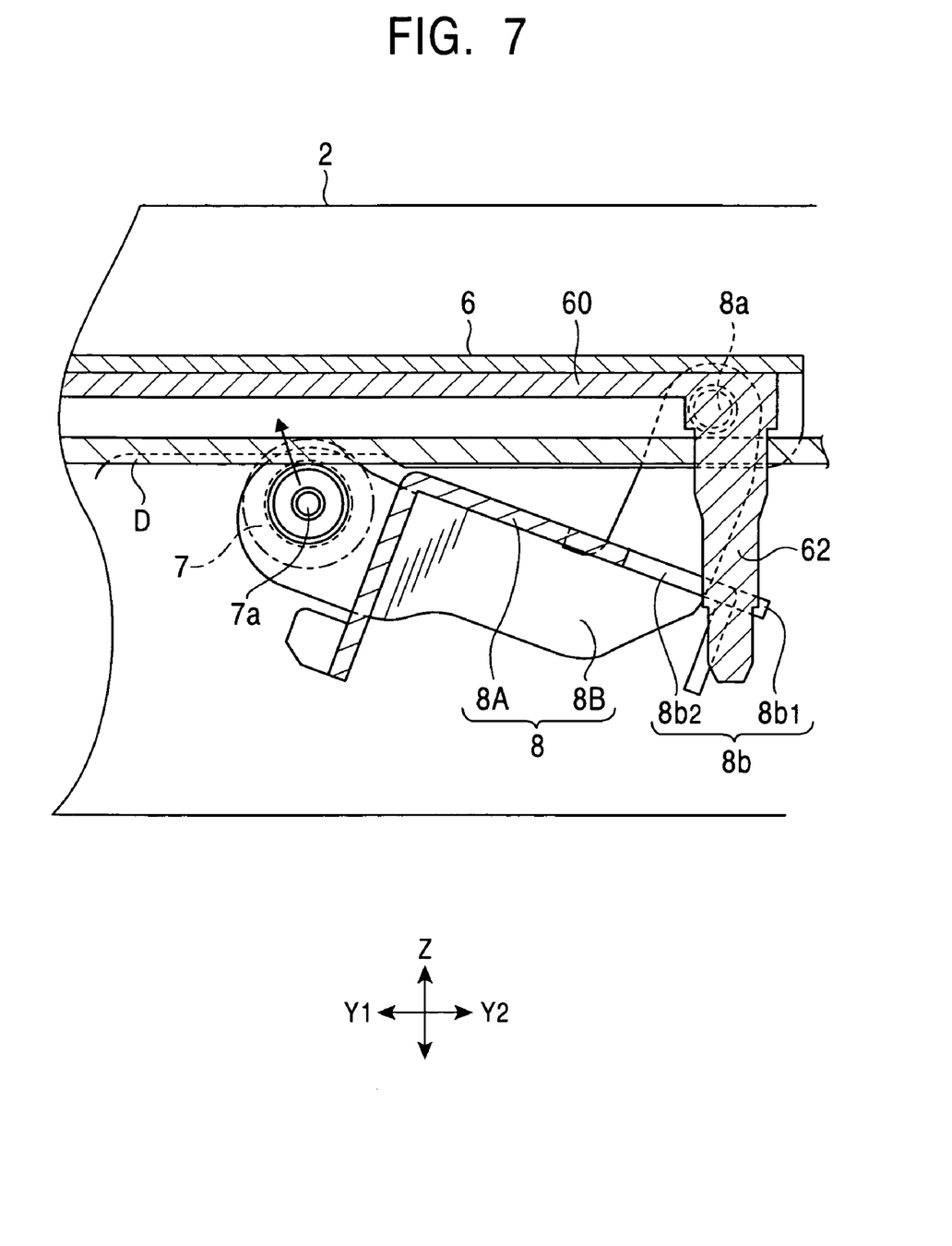
FIG. 7 is a sectional view taken along line VII—VII in FIG. 5.

In the waiting state in which a disc is not loaded, as shown in FIG. 7, the roller bracket 8 is rotated clockwise by the roller setting means, so that the transport roller 7 is lifted upward and set at the transport position. A clockwise rotational force acts upon the roller bracket 8 by a spring force, so that the transport roller 7 press-contacts a slide guide (not shown), formed of synthetic resin, that is disposed at the lower surface of the ceiling plate 6a of the chassis 6.

Since the transmitting arm 60 is rotated counterclockwise by the coil spring 140, and the transmitting arm 70 is rotated clockwise by the coil spring 141, the distance between the detection protrusion 62 and the opposing detection protrusion 72 is small. Here, as shown in FIG. 7, since the roller bracket 8 rotates clockwise, so that the front edge of the body 8A at the insertion opening 3 side is descended, the restricting portions 8b1 and 8b1 of the restraining sections 8b and 8b oppose the lower ends of the detection protrusions 62 and 72. Therefore, the detection protrusions 62 and 72, which are subjected to resilient forces of the coil springs 140 and 141 and which try to approach each other, contact the restricting portions 8b1 and 8b1 in order to prevent the distance between the detection protrusions 62 and 72 from becoming smaller. The distance between the detection protrusions 62 and 72 is set so that the outer peripheral edge of either the large-diameter disc D or the small-diameter disc Ds that is inserted from the insertion opening 3 contacts both of the detection protrusions 62 and 72. Since the lower end portions of the detection protrusions 62 and 72 are not in the respective recesses 8b2 and 8b2 of the respective restraining sections 8b and 8b, the detection protrusions 62 and 72 are in a state in which they can move away from each other.

In the state shown in FIG. 3, the positioning protrusions 82 and 92 are positioned in the first guide paths 121 and 131 of the respective positioning selection holes 120 and 130. At this time, the overall lengths of the coil springs 140 and 141 are shortest.

The chassis 6 is locked by the lock mechanism in the housing 2. The clamp arm 11 is lifted upward by the clamper setting means, so that the clamper 12 is separated in the unclamping posture from the turntable 4b.

(Disc Loading)

From the state shown in FIG. 3, when the large-diameter disc D having a diameter of 12 cm is inserted from the insertion opening 3, the outer peripheral edge of the disc D comes into contact with both of the detection protrusions 62 and 72. When the disc D is in contact with the detection protrusions 62 and 72, or when it is in contact with the detection protrusions 62 and 72 and is slightly pushed inward, detecting means (not shown), such as a switch, detects the movement of the detection protrusions 62 and 72 or the transmitting arms 60 and 70, so that the insertion of the disc D into the disc device 1 is detected. Then, based on a detection signal from the detecting means, the transport roller 7 is driven by the motor (not shown).

The disc D is, first, pushed in by hand power. Then, the disc D is clamped by the transport roller 7 and the slide guide, and is pulled towards the back side of the disc device 1 by rotational force of the transport roller 7. At this time, as shown in FIG. 4, the outer peripheral edge of the disc D pushes the detection protrusion 62 in an X2 direction, causing the transmitting arm 60 to rotate clockwise around the shaft 61 as a fulcrum. Similarly, the outer peripheral edge of the disc D pushes the detection protrusion 72 in an X1 direction, causing the transmitting arm 70 to rotate counterclockwise around the shaft 71 as a fulcrum.

Since the transmitting arm 60 and the transmitting arm 70 are connected by the connecting member 51, the transmitting arm 60 and the transmitting arm 70 rotate in response to each other, so that the distance between the detection protrusion 62 and the movement central line S—S passing through the center of rotation of the turntable 4b and the distance between the detection protrusion 72 and the movement central line S—S are always the same. Therefore, the center of the disc D is transported so that it passes along the movement central line S—S.

When the large-diameter disc D is inserted, the distance between the detection protrusion 62 and the detection protrusion 72 is increased, so that the transmitting arms 60 and 70 are largely rotated, causing the positioning members 80 and 90, which are connected to the respective transmitting arms 60 and 70, to move by a large amount in the directions in which they approach each other. The positioning protrusion 82 slides in the Y1 direction while being lightly resiliently pressed by inner edges 123 and 124 defining the positioning selection hole 120. Similarly, the positioning protrusion 92 slides in the Y1 direction while being lightly resiliently pressed by inner edges 133 and 134 defining the positioning selection hole 130. Therefore, as shown in FIG. 4, the positioning protrusions 82 and 92 move out of their respective first guide paths 121 and 131.

Figure 5:
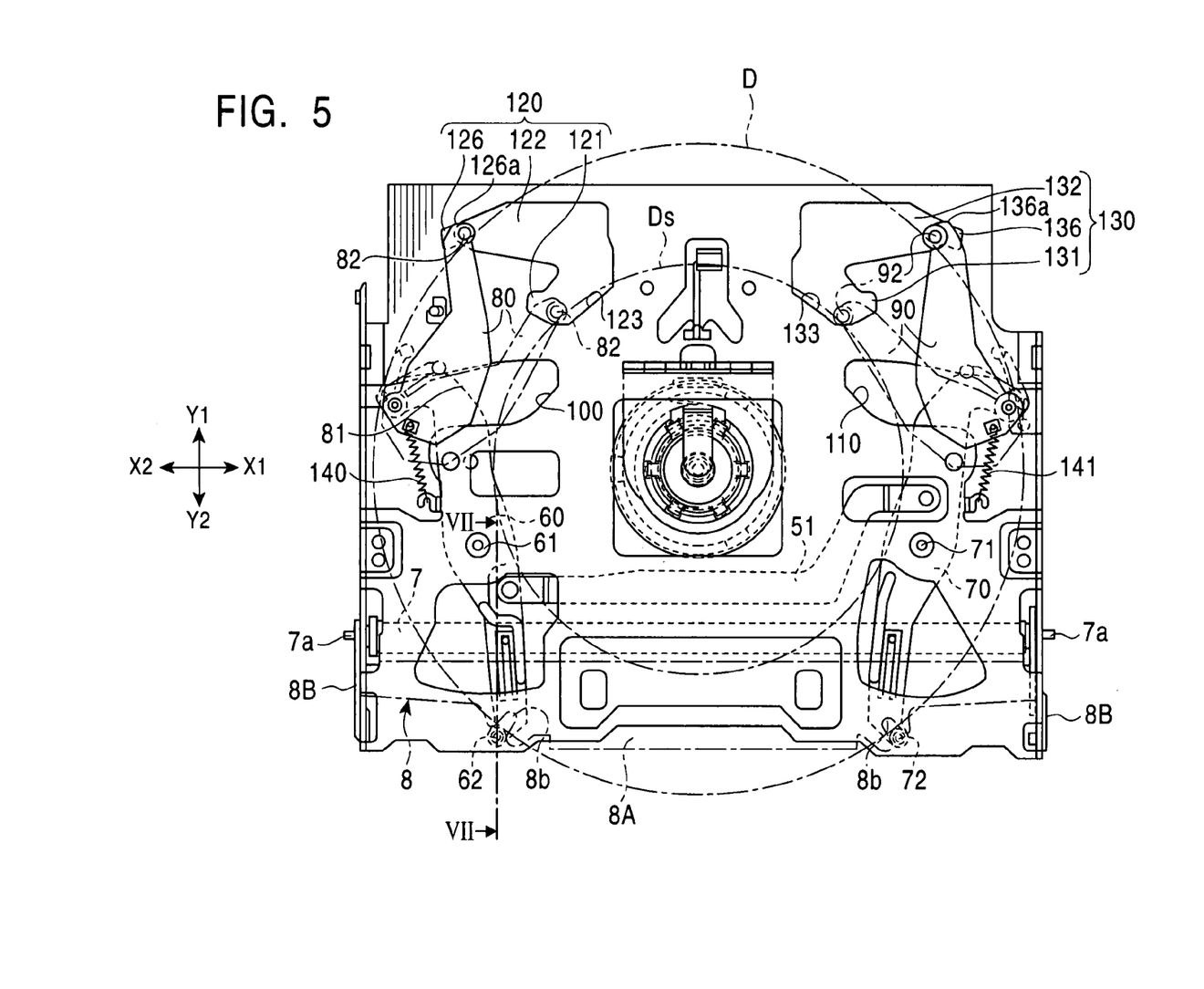
FIG. 5 is a plan view of the disc device in a disc insertion completion state in which the outer peripheral edge of the transported disc is in contact with positioning protrusions.

When the center of the large-diameter disc D moves closer the back side of the disc device 1 than the detection protrusions 62 and 72, the transmitting arm 60 moves counterclockwise and returns to its original position by the urging force of the coil spring 140, and the transmitting arm 70 moves clockwise and returns to its original position by the urging force of the coil spring 141. As shown in FIG. 5, the positioning protrusions 82 and 92 are moved into the respective second guide paths 122 and 132 without returning to the respective first guide paths 121 and 122. When the center of the large-diameter disc D is substantially above the center of the turntable 4*b*, the large-diameter disc D pushes the positioning protrusion 82 against a contact portion 126*a* that is disposed slightly inward from an edge 126 at the back side of the second guide path 122, and the positioning protrusion 92 against a contact portion 136*a* that is disposed slightly inward from an edge 136 at the back side of the second guide path 132. At this time, the positioning protrusions 82 and 92 are positioned, and the outer peripheral edge of the disc D comes into contact with the positioning protrusions 82 and 92, so that the disc D is positioned with the center of the disc D being above the center of the turntable 4.

When the small-diameter disc Ds having a diameter of 8 cm is inserted and transported by the transport roller 7, the outer peripheral edge of the disc Ds pushes the detection protrusion 62 in the X2 direction and the detection protrusion 72 in the X1 direction. In the case of the small-diameter disc Ds, the distance between the detection protrusions 62 and 72 is slight, so that the positioning protrusions 82 and 92 do not move out of the respective first guide paths 121 and 131. In addition, the positioning protrusions 82 and 92 are disposed slightly inward from the back end portions of the respective first guide paths 121 and 131. With the small-diameter disc Ds being in contact with the positioning protrusions 82 and 92, the center of the disc Ds is positioned above the center of the turntable 4*b*. Accordingly, by the difference between the amounts of movement of the detection protrusions 62 and 72 and the transmitting arms 60 and 70 when the small-diameter disc Ds is inserted and the amounts of movement of the detection protrusions 62 and 72 and the transmitting arms 60 and 70 when the large-diameter disc D is inserted, the positioning members 82 and 92 are selectively moved into the respective first guide paths 121 and 131 or the respective second guide paths 122 and 132, so that the positioning members 82 and 92 can be set at locations where the small-diameter disc Ds is positioned or locations where the large-diameter disc D is positioned.

By measuring the amounts of movement of the detection protrusions 62 and 72 and the transmitting arms 60 and 70 by sensing means (not shown), it is possible to determine whether the disc that is inserted from the insertion opening 3 is the large-diameter disc D or the small-diameter disc Ds.

With the large-diameter disc D or the small-diameter disc Ds being positioned, as shown in FIG. 5, the detection protrusions 62 and 72 are close to each other, and are subjected to the urging forces of the respective coil springs 140 and 141 and come into contact with the restricting portions 8*b*1 and 8*b*1 of the respective restraining sections 8*b* and 8*b*, so that they return to the positions that they occupy during the disc insertion waiting state.

When a detection switch (not shown) detects that the disc has been positioned, the motor for driving the transport roller 7 is stopped. Therefore, the transport roller 7 stops applying the transport force to the large-diameter disc D or the small-diameter disc Ds. The clamp arm 11 is moved downward by the urging force of the torsion spring 13, so that the central portion of the large-diameter disc D or the small-diameter disc Ds is clamped by the turntable 4*b* and the clamper 12.

Figure 8:
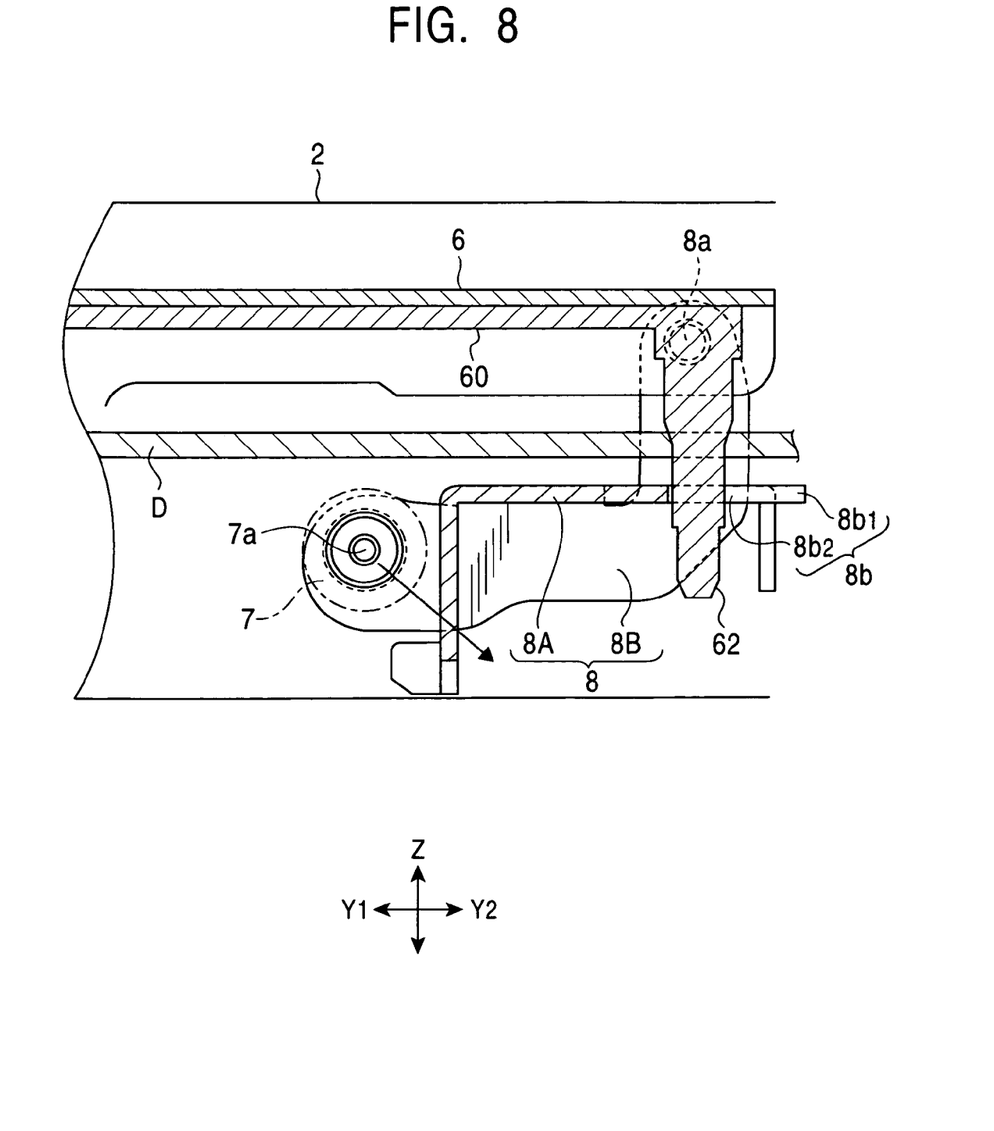
FIG. 8 is a sectional view taken along line VIII—VIII in FIG. 6.

In synchronism with this, the roller setting means is driven, so that, as shown in FIG. 8, the roller bracket 8 rotates counterclockwise, causing the transport roller 7 to separate from the lower surface of the disc, and to move to the retreat position where it cannot apply the transport force. In addition, the lock mechanism (not shown) is driven, so that the chassis 6 is unlocked, and is resiliently supported in the housing 2.

Figure 6:
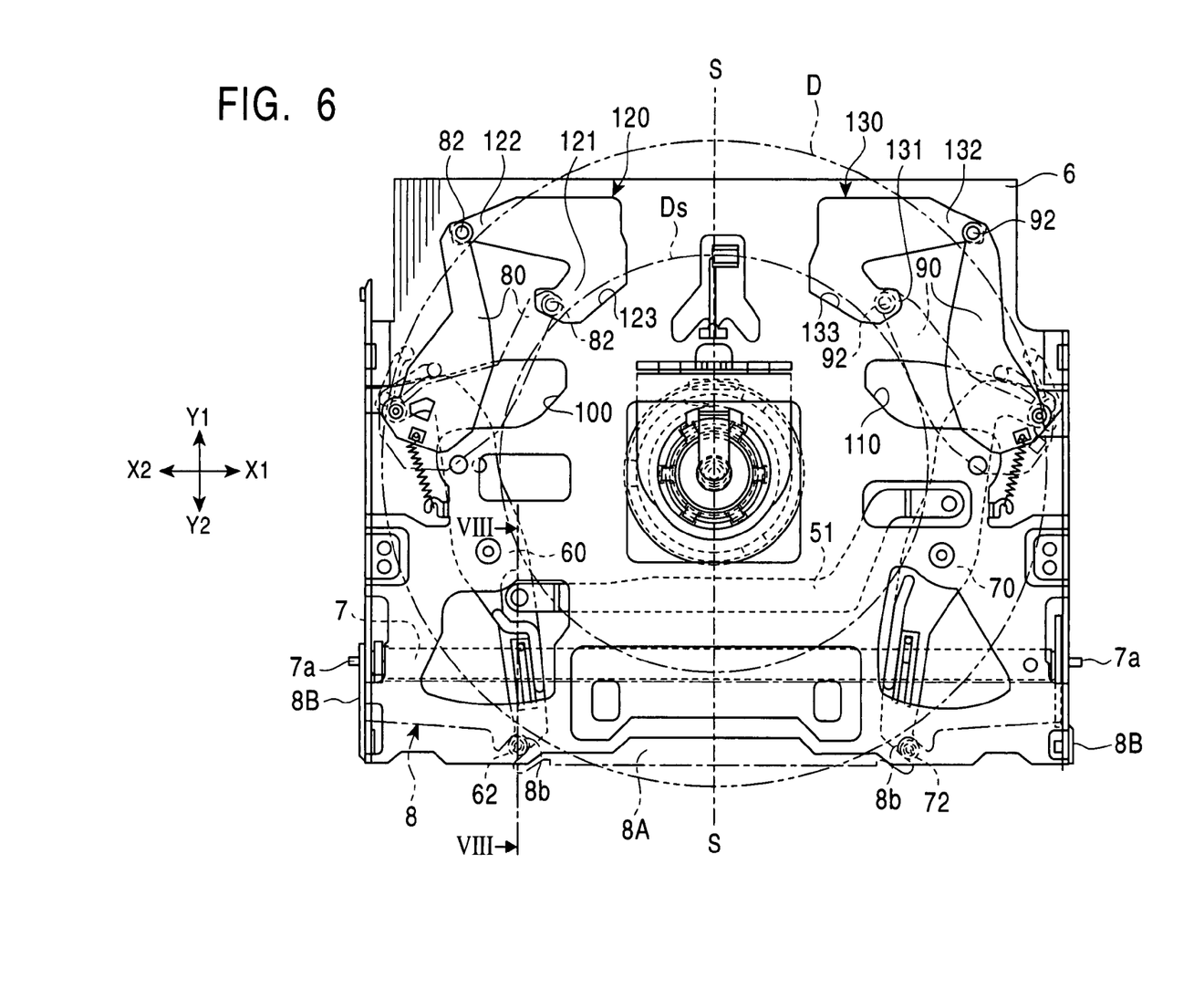
FIG. 6 is a plan view of the disc device in a disc rotationally driven state.

As shown in FIGS. 6 and 8, when the roller bracket 8 rotates counterclockwise, the front edge (at the insertion opening 3 side) of the body 8A of the roller bracket 8 is moved upward. In other words, as shown in FIGS. 7 and 8, the roller bracket 8 rotates around the shafts 8*a* as rotational fulcra. The transport roller 7 is supported closer to the back side (Y1 side) of the disc device 1 than the rotational fulcra, and the restraining sections 8*b* are disposed closer to the insertion opening (Y2 side) than the rotational fulcra. Therefore, when the transport roller 7 separates from the disc and moves downward, the restraining sections 8*b* move upward from the position shown in FIG. 7 to the position shown in FIG. 8. In addition, since the rotational fulcra are positioned upwardly of the restraining sections 8*b*, when the roller bracket 8 rotates from the position shown in FIG. 7 to the position shown in FIG. 8, the front edge of the body 8A of the roller bracket 8 moves upward along an arc path (rotational path) extending towards the insertion opening 3.

When the restraining sections 8*b* move upward along the path, the points of contact between the restraining sections 8*b* and 8*b* and the respective detection protrusions 62 and 72 move towards the recesses 8*b*2 from the respective restricting portions 8*b*1. Since the recesses 8*b*2 and 8*b*2 are inclined with respect to the movement central line S—S so that the distance between them decreases as they extend towards the back side of the disc device 1, the detection protrusions 62 and 72 are guided into the respective recesses 8*b*2 and 8*b*2 and move towards each other, as shown in FIG. 6. In this embodiment, since the detection protrusions 62 and 72 are urged towards each other by the coil springs 140 and 141, the detection protrusions 62 and 72 are reliably guided into the recesses 8*b*2 and 8*b*2 by the urging forces by the time the restraining sections 8*b* and 8*b* are rotated to the positions shown in FIG. 8.

When the detection protrusions 62 and 72 are guided into the respective recesses 8*b*2 and 8*b*2, and are restrained, the transmitting arm 60 rotates slightly counterclockwise, and the transmitting arm 70 rotates slightly clockwise. Along with this, an end portion of the positioning member 80 disposed towards the back side of the disc device 1 moves in the X2 direction, and an end portion of the positioning member 90 disposed towards the back side of the disc device 1 moves in the X1 direction.

When the large-diameter disc D is loaded, the positioning protrusion 82 is moved towards an X2-side terminal end of the second guide path 122, and separates from the outer peripheral edge of the large-diameter disc D. Similarly, the positioning protrusion 92 is moved towards an X1-side terminal end of the second guide path 132 and separates from the outer peripheral edge of the large-diameter disc D.

When the small-diameter disc Ds is loaded, as indicated by an alternate long and short dash line shown in FIG. 6, the positioning protrusion 82 moves towards an X2-side terminal end of the first guide path 121 and separates from the outer peripheral edge of the small-diameter disc Ds. Similarly, the positioning protrusion 92 moves towards an X1-side terminal end of the first guide path 131 and separates from the outer peripheral edge of the small-diameter disc Ds.

In the disc device 1, when either the large-diameter disc D or the small-diameter disc Ds is clamped to the turntable 4b, the disc D or Ds does not contact the protrusions 62 and 72 or the positioning protrusions 82 and 92. Therefore, the large-diameter disc D or the small-diameter disc Ds can be smoothly rotationally driven along with the turntable 4b. Then, information is reproduced or recorded with an optical head (not shown).

When the disc is clamped to the turntable 4b, the detection protrusions 62 and 72 move into the recesses 8b2 and 8b2 of the respective restraining sections 8b and 8b in order to restrict the movement of the detection protrusions 62 and 72 in the X1 direction and the X2 direction. Therefore, even if someone tries to insert another disc from the insertion opening 3, the disc will not pass between the detection protrusions 62 and 72 and be transported towards the back side of the disc device 1. Therefore, it is possible to prevent what is called double insertion where two discs are inserted into the disc device 1.

(Disc Discharging Operation)

When the disc is ejected, the clamper setting means is driven to lift up the clamp 5 from the clamping posture to the unclamping posture. Then, the roller setting means is driven, causing the roller bracket 8 to move from the retreat position to the transport position, so that the transport roller 7 comes into contact with the lower surface of the disc, and is set at the transport position where it applies transport force.

At this time, when the roller bracket 8 rotates from the posture shown in FIG. 8 to the posture shown in FIG. 7, the detection protrusions 62 and 72 that have been positioned in the respective inclined recesses 8b2 and 8b2 move out of the respective recesses 8b2 and 8b2 and move to locations where they contact their respective restricting portions 8b1 and 8b1.

From this state, when the disc is transported towards the insertion opening 3 by the transport roller 7, the outer peripheral edge of the disc pushes the detection protrusions 62 and 72 outwards. When the disc is completely ejected from the insertion opening 3, the detection protrusions 62 and 72 return to the positions that they occupy during the waiting state shown in FIG. 3. When the disc is ejected, the outer peripheral edge of the disc temporarily pushes the detection protrusions 62 and 72 away from each other. Then, when the detecting means detects that the detection protrusions 62 and 72 have moved towards each other, that is, that the disc discharging operation is completed, the rotation of the transport roller 7 is stopped.

In the embodiment, although the restraining sections 8b and 8b are formed in a bumpy form in the roller bracket 8, the restraining sections may be integrally formed with the roller bracket, or they may be formed separately from the roller bracket and mounted to the roller bracket.

It is to be understood that a wide range of changes and modifications to the embodiments described above will be apparent to those skilled in the art and are contemplated. It is therefore intended that the foregoing detailed description be regarded as illustrative, rather than limiting, and that it be understood that it is the following claims, including all equivalents, that are intended to define the spirit and scope of the invention.

What is claimed is:

1. A disc device comprising:
   a disc driving section including a turntable;
   a transport roller operable to transport a disc towards the disc driving section;
   a positioning member disposed closer to a back side of the disc device than the disc driving section in a disc insertion direction, wherein an outer peripheral edge of the disc that is transported by the transport roller comes into contact with the positioning member and is positioned so that a central portion of the disc is set at the disc driving section;
   a detection section disposed closer to a front side of the disc device than the disc driving section in the disc insertion direction, the detection section being pushed and moved by the outer peripheral edge of the disc that is transported towards the disc driving section;
   a transmitting member operable to transmit movement of the detection section to the positioning member;
   a roller supporting member operable to move the transport roller to a transport position where the transport roller is capable of transporting the disc and to a retreat position where the transport roller is separated from the disc; and
   a restraining section disposed at the roller supporting member,
   wherein when the transport roller moves to the retreat position, the detection section is restrained by being moved in a predetermined direction by the restraining section, and the movement of the detection section when restraining the detection section is transmitted to the positioning member through the transmitting member, so that the positioning member moves so as to separate from the outer peripheral edge of the disc.

2. The disc device of claim 1, wherein the roller supporting member moves the transport roller to the transport position and to the retreat position by rotating around a shaft that is substantially parallel to a disc surface, and wherein the restraining section is disposed at a portion of the roller supporting member that approaches the disc when the transporter roller moves towards the retreat position.

3. The disc device of claim 1, wherein the restraining section has a recess, and wherein, when the transport roller moves from the transport position to the retreat position, the detection section is restrained by being guided into the recess.

4. The disc device of claim 3, wherein the recess extends in an inclined manner with respect to a central line of movement of the disc that is transported by the transport roller, and wherein, when the transport roller moves from the transport position to the retreat position, the detection section moves in the predetermined direction by being guided to the recess.

5. The disc device of claim 1, wherein the detection section is urged in a direction in which the detection section contacts the outer peripheral edge of the disc that is transported, and wherein the restraining section comprises a restricting portion and a recess, the restricting portion restricting movement of the detection section in the urging direction when the transport roller is set at the transport position, the recess guiding the detection section that is separated from the restricting portion when the transport roller moves towards the retreat position.

6. The disc device of claim 5, wherein the recess extends in an inclined manner with respect to a central line of movement of the disc that is transported by the transport roller, and wherein, when the transport roller moves from the transport position to the retreat position, the detection section moves in the predetermined direction by being guided to the recess.

7. The disc device of claim 1, wherein the transmitting member rotates around a rotary shaft that is substantially perpendicular to a disc surface, and wherein the detection section is disposed at one end of the transmitting member and the positioning member is connected to the other end of the transmitting member.

8. The disc device of claim 1, wherein the transport roller is capable of transporting a large-diameter disc and a small-diameter disc, and wherein, by a difference between an amount of movement of the transmitting member when the detection section is pushed by an outer peripheral edge of the large-diameter disc and an amount of movement of the transmitting member when the detection section is pushed by an outer peripheral edge of the small-diameter disc, the positioning member is selectively set at one of a position where the positioning member positions a central portion of the small-diameter disc at the disc driving section and a position where the positioning member positions a central portion of the large-diameter disc at the disc driving section.

9. The disc device of claim 8, further comprising a chassis having the disc driving section including a first guide path and a second guide path that are continuously formed, the second guide path being located closer to the back side of the disc device than the first guide path in the disc insertion direction, wherein the positioning member is movable in the first guide path and the second guide path, by the difference between the amounts of movement of the transmitting member, the positioning member selectively enters one of the first guide path and the second guide path, when the positioning member enters the first guide path, the central portion of the small-diameter disc is capable of being positioned at the disc driving section, and when the positioning member enters the second guide path, the central portion of the large-diameter disc is capable of being positioned at the disc driving section.

10. The disc device of claim 1, wherein when the detection section is pushed and moved by the outer peripheral edge of the disc, insertion of the disc into the disc device and/or ejection of the disc from the disc device are/is detected.

11. A disc device comprising:
a disc driving section including a turntable;
a transport roller operable to transport a disc towards the disc driving section
a positioning member disposed closer to a back side of the disc device than the disc driving section in a disc insertion direction,
wherein an outer peripheral edge of the disc that is transported by the transport roller comes into contact with the positioning member and is positioned so that a central portion of the disc is set at the disc driving section,
a detection section disposed closer to a front side of the disc device than the disc driving section in the disc insertion direction, the detection section being pushed and moved by the outer peripheral edge of the disc that is transported towards the disc driving section;
a transmitting member operable to transmit movement of the detection section to the positioning member;
a roller supporting member operable to move the transport roller to a transport position where the transport roller is capable of transporting the disc and to a retreat position where the transport roller is separated from the disc; and
a restraining section, disposed at the roller supporting member, including a recess,
wherein when the transport roller moves to the retreat position, the detection section is restrained by being moved in a predetermined direction as a result of being guided into the recess, and the movement of the detection section when restraining the detection section is transmitted to the positioning member through the transmitting member, so that the positioning member moves so as to separate from the outer peripheral edge of the disc.

12. The disc device of claim 11, wherein the roller supporting member moves the transport roller to the transport position and to the retreat position by rotating around a shaft, that is substantially parallel to a disc surface, and wherein the restraining section is disposed at a portion of the roller supporting member that approaches the disc when the transporter roller moves towards the retreat position.

13. The disc device of claim 11, wherein the detection section is urged in a direction in which the detection section contacts the outer peripheral edge of the disc, and wherein the restraining section comprises a restricting portion, disposed continuously with the recess, for restricting movement of the detection section in the urging direction when the transport roller is set at the transport position, and wherein the detection section that is separated from the restricting portion is guided into the recess when the transport roller moves from the transport position to the retreat position.

14. The disc device of claim 11, wherein the recess extends in an inclined manner with respect to a central line of movement of the disc that is transported by the transport roller, and wherein, when the transport roller moves from the transport position to the retreat position, the detection section moves in the predetermined direction by being guided to the recess.

15. The disc device of claim 11, wherein the transmitting member rotates around a rotary shaft that is substantially perpendicular to a disc surface, and wherein the detection section is disposed at one end of the transmitting member and the positioning member is connected to the other end of the transmitting member.

16. The disc device of claim 11, wherein the transport roller is capable of transporting a large-diameter disc and a small-diameter disc, and wherein, by a difference between an amount of movement of the transmitting member when the detection section is pushed by an outer peripheral edge of the large-diameter disc and an amount of movement of the transmitting member when the detection section is pushed by an outer peripheral edge of the small-diameter disc, the positioning member is selectively set at one of a position where the positioning member positions a central portion of the small-diameter disc at the disc driving section and a position where the positioning member positions a central portion of the large-diameter disc at the disc driving section.

17. The disc device of claim 16, further comprising a chassis having the disc driving section including a first guide path and a second guide path that are continuously formed, the second guide path being located closer to the back side of the disc device than the first guide path in the disc insertion direction, wherein the positioning member is movable in the first guide path and the second guide path, wherein by the difference between the amounts of movement of the transmitting member, the positioning member selectively enters one of the first guide path and the second guide path, when the positioning member enters the first guide path, the central portion of the small-diameter disc is capable of being positioned at the disc driving section, and when the positioning member enters the second guide path, the central portion of the large-diameter disc is capable of being positioned at the disc driving section.

18. A disc device according to claim 11, wherein when the detection section is pushed and moved by the outer peripheral edge of the disc, insertion of the disc into the disc device and ejection of the disc from the disc device are detected.

19. A disc device comprising:
a disc driving section including a turntable;
a transport roller operable to transport a disc towards the disc driving section;
a positioning member disposed closer to a back side of the disc device than the disc driving section in a disc insertion direction,
wherein an outer peripheral edge of the disc that is transported by the transport roller comes into contact with the positioning member and is positioned so that a central portion of the disc is set at the disc driving section,
a detection section disposed closer to a front side of the disc device than the disc driving section in the disc insertion direction, the detection section being pushed and moved by the outer peripheral edge of the disc that is transported towards the disc driving section;
a transmitting member for transmitting movement of the detection section to the positioning member;
a roller supporting member that rotates around a shaft which is substantially parallel to a disc surface for moving the transport roller to a transport position where the transport roller is capable of transporting the disc and to a retreat position where the transport roller is separated from the disc; and
a restraining section disposed at a portion of the roller supporting member that approaches the disc when the transport roller moves towards the retreat position,
wherein, when the transport roller moves to the retreat position, the detection section is restrained by being moved in a predetermined direction by the restraining section, and the movement of the detection section when restraining the detection section is transmitted to the positioning member through the transmitting member, so that the positioning member moves so as to separate from the outer peripheral edge of the disc.

20. The disc device of claim 19, wherein the restraining section has a recess, and wherein when the transport roller moves from the transport position to the retreat position, the detection section is restrained by being guided into the recess.

21. The disc device of claim 20, wherein the recess extends in an inclined manner with respect to a central line of movement of the disc that is transported by the transport roller, and when the transport roller moves from the transport position to the retreat position, the detection section moves in the predetermined direction by being guided to the recess.

22. The disc device of claim 19, wherein the detection section is urged in a direction in which the detection section contacts the outer peripheral edge of the disc that is transported, and the restraining section comprises a restricting portion and a recess, the restricting portion restricting movement of the detection section in the urging direction when the transport roller is set at the transport position, the recess guiding the detection section that is separated from the restricting portion when the transport roller moves towards the retreat position.

23. The disc device of claim 22, wherein the recess extends in an inclined manner with respect to a central line of movement of the disc that is transported by the transport roller, and when the transport roller moves from the transport position to the retreat position, the detection section moves in the predetermined direction by being guided to the recess.

24. The disc device of claim 19, wherein the transmitting member rotates around a rotary shaft, that is substantially perpendicular to a disc surface, and the detection section is disposed at one end of the transmitting member and the positioning member is connected to the other end of the transmitting member.

25. The disc device of claim 19, wherein the transport roller is capable of transporting a large-diameter disc and a small-diameter disc, and by a difference between an amount of movement of the transmitting member when the detection section is pushed by an outer peripheral edge of the large-diameter disc and an amount of movement of the transmitting member when the detection section is pushed by an outer peripheral edge of the small-diameter disc, the positioning member is selectively set at one of a position where the positioning member positions a central portion of the small-diameter disc at the disc driving section and a position where the positioning member positions a central portion of the large-diameter disc at the disc driving section.

26. The disc device according to claim 25, further comprising a chassis having the disc driving section including a first guide path and a second guide path that are continuously formed, the second guide path being located closer to the back side of the disc device than the first guide path in the disc insertion direction, wherein the positioning member is movable in the first guide path and the second guide path, by the difference between the amounts of movement of the transmitting member, the positioning member selectively enters one of the first guide path and the second guide path, when the positioning member enters the first guide path, the central portion of the small-diameter disc is capable of being positioned at the disc driving section, and when the positioning member enters the second guide path, the central portion of the large-diameter disc is capable of being positioned at the disc driving section.

27. The disc device of claim 19, wherein when the detection section is pushed and moved by the outer peripheral edge of the disc, insertion of the disc into the disc device and ejection of the disc from the disc device are detected.

* * * * *